Feb. 19, 1957 — O. W. SMITH — 2,782,051
SPRING SUSPENSION FOR A TANDEM TRAILER DEVICE
Filed Aug. 17, 1955

INVENTOR
OTHO W. SMITH
BY Kimmel & Crowell
ATTORNEYS

Feb. 19, 1957 O. W. SMITH 2,782,051
SPRING SUSPENSION FOR A TANDEM TRAILER DEVICE
Filed Aug. 17, 1955 3 Sheets-Sheet 2

INVENTOR
OTHO W. SMITH
BY *Kimmel & Crowell*
ATTORNEYS

Feb. 19, 1957     O. W. SMITH     2,782,051
SPRING SUSPENSION FOR A TANDEM TRAILER DEVICE
Filed Aug. 17, 1955     3 Sheets-Sheet 3
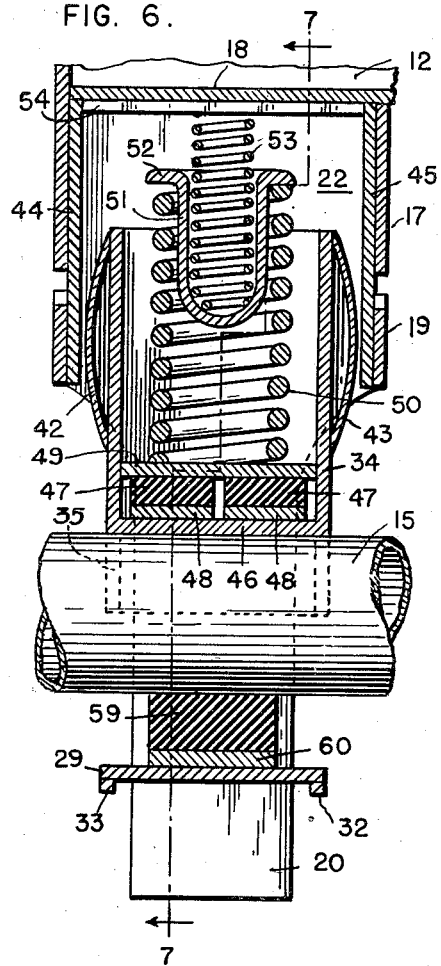
FIG. 6.
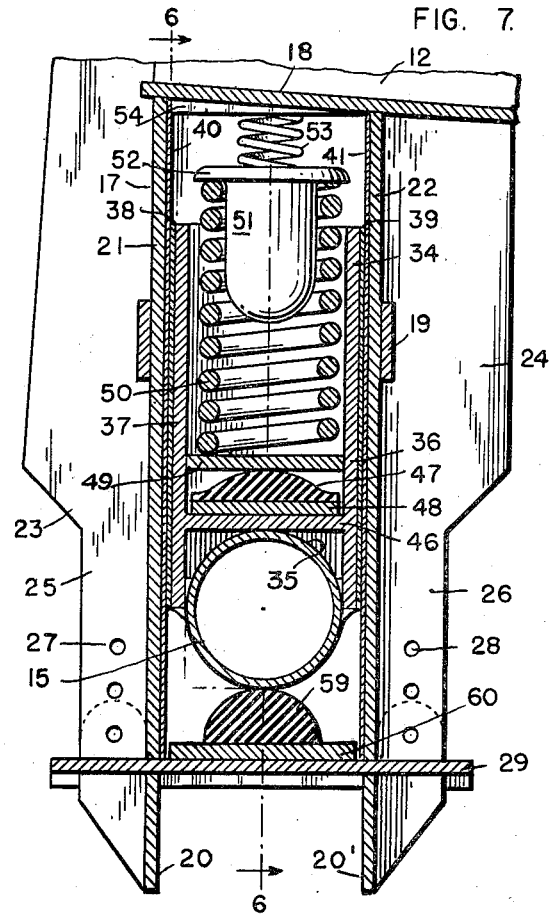
FIG. 7.
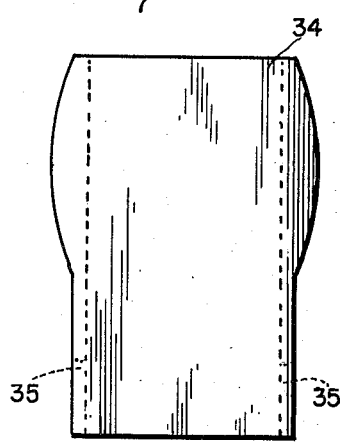
FIG. 9.
FIG. 8.
INVENTOR
OTHO W. SMITH
BY *Kimmel & Crowell*
ATTORNEYS United States Patent Office 2,782,051
Patented Feb. 19, 1957

2,782,051

SPRING SUSPENSION FOR A TANDEM TRAILER DEVICE

Otho W. Smith, Bedford, Ind.

Application August 17, 1955, Serial No. 528,946

3 Claims. (Cl. 280—124)

The present invention relates to spring suspensions for tandem trailer devices of the dolly attachment type, and is an improvement on my following listed prior patents: 2,643,890, issued June 30, 1953; 2,697,614, issued December 21, 1954; 2,714,016, issued July 26, 1955.

The primary object of the invention is to increase the legal as well as the actual load-carrying capacity of a tractor truck by interposing a dolly between the truck and the trailer carried thereby without materially increasing the height or length of the combination, or providing additional spring shackles and torque arms with their resultant servicing problems.

Another object of the invention is to provide a detachable dolly structure of the class described above for attachment to a tractor truck which will relieve the tractor truck of a substantial portion of the trailer weight attached thereto.

A further object of the invention is to provide a tandem trailer device for attachment to a tractor truck which will be held against turning relative to the tractor on backing same so as to eliminate the danger of jack-knifing.

A still further object of this invention is to provide a dolly attachment for a tractor truck which will provide an additional load-bearing axle permitting additional loads to be carried on the combination without violating axle load limit laws.

Another object of the invention is to provide a dolly of the tandem trailer type wherein a relatively low fifth wheel is carried by the unit to support the front end of the trailer.

Still another object of the invention is to provide a construction of the character described above which, while increasing the capacity of the truck, reduces the over-all weight of the prior art structures, will require less maintenance, and be extremely economical to service.

A further object of the invention is to produce a spring suspension which will occupy a relatively short length to permit the dolly to be coupled quite closely to the tractor truck.

A still further object of the invention is to produce in a dolly construction of the class described a spring suspension which will permit the axle to swing on a longitudinal horizontal imaginary pivot to the full limit of the framework and which will materially reduce shock on running empty.

Another object of the invention is to provide a spring suspension for a dolly of this type which will, due to the angular setting thereof, cause the wheels of the dolly to follow over bumps rather than be impeded thereby.

And still another object of the invention is to produce a dolly structure of the class described which will increase the over-all capacity of the truck trailer combination by adding an additional load-carrying axle.

Other objects and advantages will become apparent in the following specification when considered in the light of the attached drawings, in which:

Figure 6 is a transverse vertical cross section taken along the line 6—6 of Figure 7, looking in the direction of the arrows;

Figure 7 is a longitudinal vertical cross section taken along the line 7—7 of Figure 6, looking in the direction of the arrows;

Figure 8 is a bottom plan view of the retainer plate, and

Figure 9 is a rear elevation of the axle guide.

Figure 1:
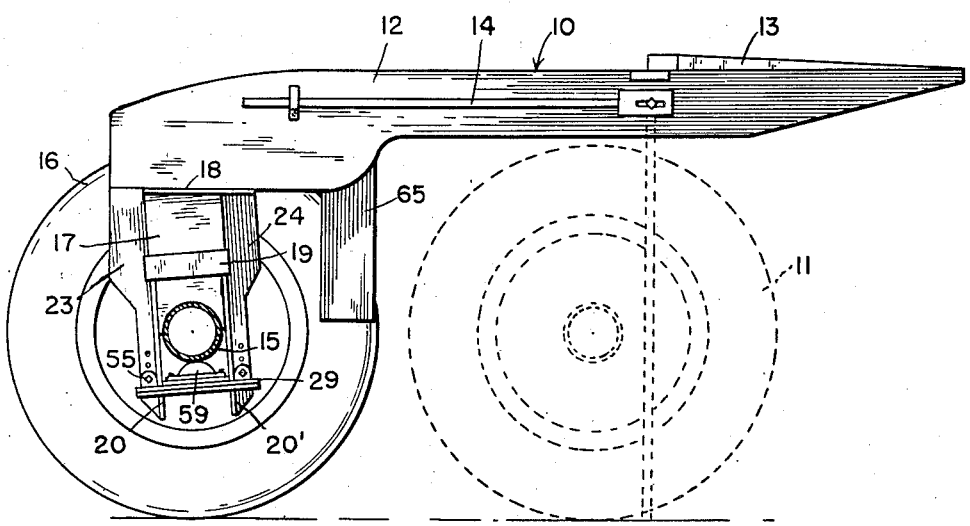
Figure 1 is a side elevation of the invention, shown partially in cross section and partly broken away for purposes of clarity.
Figure 3:
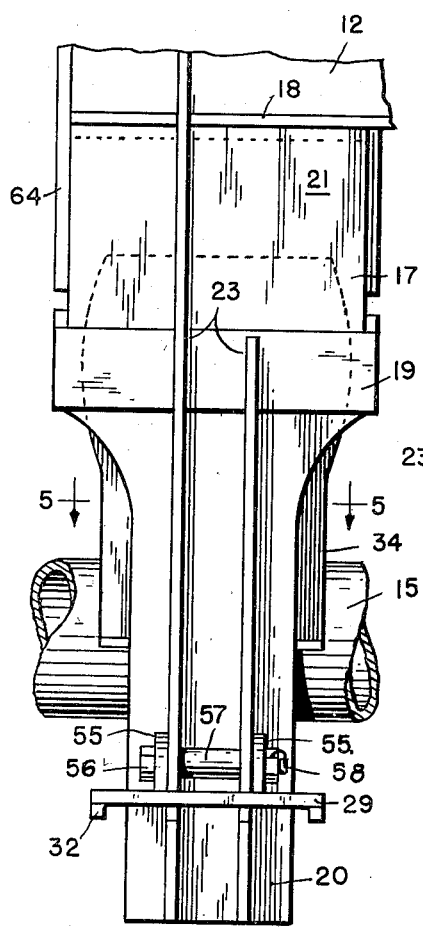
Figure 3 is a rear elevation of one of the units with parts broken away.
Figure 4:
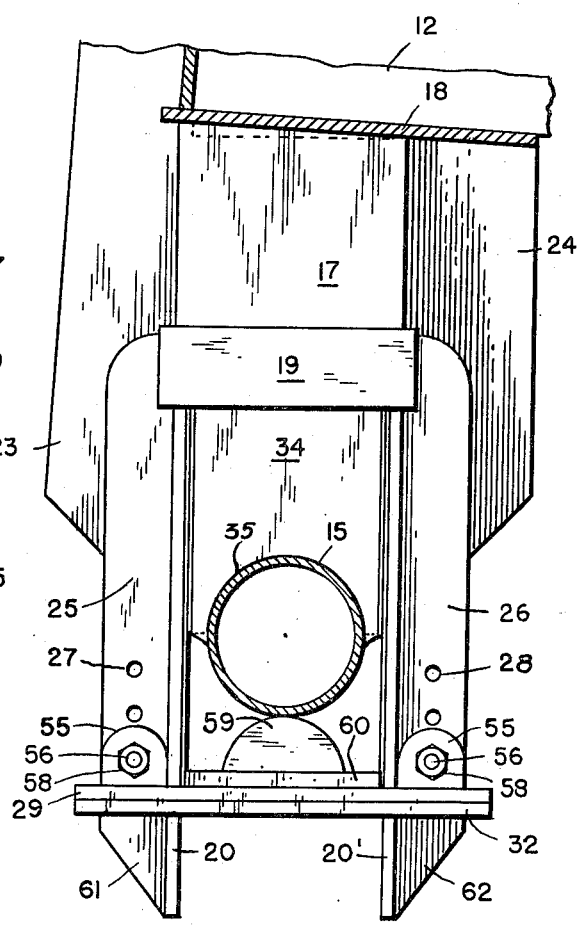
Figure 4 is a side elevation of one of the units with the axle shown in cross section.
Figure 5:
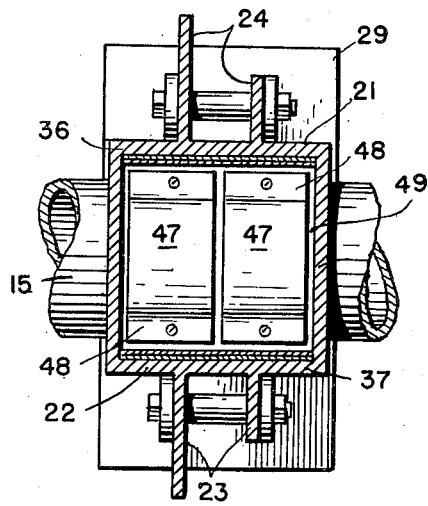
Figure 5 is a transverse horizontal cross section taken along the line 5—5 of Figure 3, looking in the direction of the arrows.

Referring now to the drawings in detail wherein like reference numerals indicate like parts throughout the several figures, the reference numeral 10 indicates generally the tandem trailer device comprising a load-carrying attachment for a truck, one wheel of which is indicated in dotted lines at 11 in Figure 1. The dolly 10 is provided with a frame 12 having an adjustable fifth wheel 13 at the forward end thereof for attachment to a tractor truck. The adjustable fifth wheel 13 is slanted forward, as illustrated in Figure 1, to avoid contact with the forward lower edge of the trailer when the device is moving through the bottom area of a road between two hills. The frame 12 is provided with a pair of support arms 14, one of which is shown in dotted lines in engagement with the ground in Figure 1, showing dolly 10 supported thereby.

An axle 15 is positioned at right angles to the dolly 10 and extends thereacross carrying wheels 16 on the outer ends thereof in the usual manner. A rectangular housing 17 having an upper plate 18 is mounted to the frame 12 of the dolly 10 and is reinforced at a point spaced apart from the frame 12 by means of a band 19 which extends completely around the housing 17 and is welded or otherwise secured thereto. The lower ends 20 and 20' of the front and rear panels 21 and 22 of the housing 17 are reduced in transverse size and extend well below the axle 15. A pair of strengthening webs 23 and 24 extend vertically across the front and rear panels 21 and 22 to strengthen them. The webs 23 and 24 are welded or otherwise secured to the front and rear panels 21 and 22 and are provided with reduced cross section areas 25 and 26, respectively, having a series of attachment holes 27 and 28 vertically spaced therein. A retainer plate 29 having a generally rectangular shape is provided with a pair of U-shaped slots 30, 31 with the legs of the U's extending oppositely. The retainer plate 29 is provided with a pair of oppositely disposed reinforcing bars 32 and 33 which are welded or otherwise secured to the lower side edges of the plate 29. An axle guide 34 consists of a rectangular housing having the side walls thereof cut away as at 35 to engage over the axle 15, as illustrated in Figures 6 and 7. A front wall 36 and a rear wall 37 extend down beside the axle 15 and are welded thereto. The front and rear walls 36 and 37 are provided with wear plates 38 and 39 on the outer surface thereof, and the front and rear walls 21 and 22 of the housing 17 are provided internally with wear plates 40 and 41. The axle guide 34 is telescopically received within the housing 17, with the wear plates 38 and 39 in contact with the wear plates 40 and 41, respectively. Arcuate side plates 42 and 43 extend between the upper portion of the front and rear walls 36 and 37 to provide an arcuate bearing to engage the side walls 44 and 45 of the housing 17. A base plate 46 extends between the front and rear walls 36 and 37 in perpendicular relation thereto and is in engagement with the axle 15. A pair of rubber bumpers 47, carried by a pair of metal plates 48, are secured to the base plate 46 by any suitable means (not shown).

Figure 2:
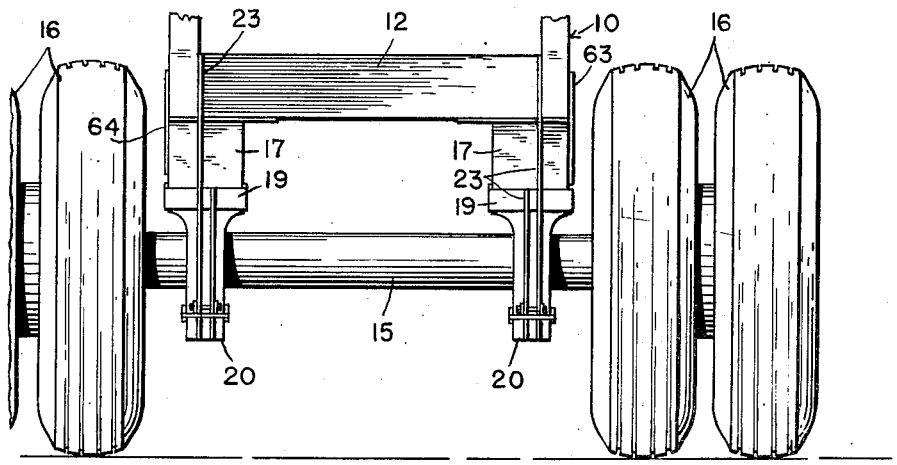
Figure 2 is a rear elevation of the invention partly broken away.

An intermediate plate 49 is mounted within the axle guide 34 against the rubber cushions 47 and is adapted to support a coil spring 50 which extends upwardly therefrom through the axle guide 34. A spring cup 51, having an outwardly directed flange 52, is positioned within the spring 50 with the flange 52 in engagement with the top of the spring 50. A somewhat lighter spring 53 is positioned with one end extending into the cup 51 and the other end in engagement with a wedge shaped spring seat 54 mounted in the top of the housing 17. The retainer plate 29 is provided with upstanding ears 55 adjacent the outer edge of each leg of the U-shaped slots 30 and 31. The ears 55 are transversely bored to receive a bolt 56 which passes therethrough and carries a spacer 57 between the webs 23 and 26. A nut 58 is mounted on the bolt 56 to secure the retainer plate 29 to the lower ends 20 and 20' of the front and rear plates 21 and 22. The retainer plate 29 is positioned over the lower ends 20 and 20' of the front and rear plates 21 and 22, with the lower portions 20 and 20' extending through the slots 30 and 31 along with the webs 25 and 26, the bolt 56 being positioned in one of the holes 27 in the webs 25 and 26 to secure the retainer plate 29 in position on the lower portions 20 and 20'. A rubber bumper 59, having a plate 60 secured thereto, is fastened to the upper face of the retainer plate 29 between the front and rear plates 21 and 22 with the rubber bumper 59 in position to engage the lower side of the axle 15. The lower ends 25 and 26 of the webs 23 and 24 are inwardly bevelled as at 61 and 62 to assist in assembling the retainer plate 29 thereon. The upper plate 18 of the housing 17 is secured to the frame 12 of the dolly 10 with one of the housings 17 on each side thereof, as illustrated in Figure 2, and with the housings 17 sloped rearwardly from the lower ends to the upper ends thereof. An axle 15 extends through each of the housings 17, as illustrated in Figure 2, and the axle guides 34 are adapted to reciprocate vertically in the housings 17 against the tension of the springs 50 and 53. When one end of the axle 15 is raised higher than the other end, the axle guides 34 turn in the housings 17 with the arcuate side plates 42 and 43 engaging the sides 44 and 45 of the housings 17 while the off center reciprocation between the axle guide 34 and housings 17 takes place.

The webs 23 extend upwardly above the housings 17 and are secured to the frame 12. Side plates 63 and 64 extend downwardly from the frame 12 beside the outer sides of the housing 17 to assist in bracing the housing 17 to the dolly 10. The dolly 10 is provided with a truck frame engaging member 65 which maintains the dolly 10 in alignment with the tractor truck it is attached to, as described in my aforementioned patents.

It should be understood that the provision of the sloped housings 17 provide a means for causing the wheel 16 to follow on striking a bump due to the axle 15 moving rearwardly so as to provide a smoother spring action on the dolly.

The use of the light spring 53 and the heavy spring 50 produces a much softer ride of the dolly 10 when the dolly is unloaded. It should be understood, of course, that upon loading of the dolly 10 the flange 52 of the cup 51 will come into engagement with the plate 54 and the total springing of the dolly will be accomplished by the heavy spring 50.

Having thus described the preferred embodiment of the invention, it should be understood that numerous modifications and structural adaptations may be resorted to without departing from the scope of the appended claims.

What is claimed is:

1. A trailer supporting dolly adapted for attachment to a tractor comprising, a frame, means for connecting said frame to a tractor, an axle, wheels rotatably secured to opposite ends of said axle, a pair of housings depending from and secured to said frame in spaced-apart relation, a pair of rectangular tubular guides secured to said axle with one of said guides being vertically slidable in one of said housings and the other of said guides being vertically slidable in the other of said housings, means seated in and supported by said guide normally biasing said guide means out of said housing, vertically adjustable means on said housing limiting the movement of said guide therefrom, and arcuate means on said guide cooperating with the inner surface of said housing whereby lateral rocking motion of said axle is accommodated.

2. A device as claimed in claim 1, wherein said means limiting the movement of said guide from said housing extends below said axle, a resilient bumper block secured to said limiting means in position to engage under said axle.

3. A device as claimed in claim 1, wherein said biasing means includes a coil spring positioned in said guide means, a cup carried by the upper end of said coil spring in telescoping relation thereto, and a second coil spring seated within said cup and engaging the top of said housing, said second coil spring being substantially weaker than said first coil spring whereby an unloaded trailer is resiliently carried by said second coil spring in combination with said first coil spring whereas a loaded trailer will compress said second coil spring into said cup moving the upper face of said cup into engagement with the top of said housing.

References Cited in the file of this patent

UNITED STATES PATENTS

| 1,120,036 | Dearing | Dec. 8, 1914 |
| 2,493,025 | Pointer | Jan. 3, 1950 |
| 2,637,569 | Turner | May 5, 1953 |

FOREIGN PATENTS

| 116,511 | Great Britain | Sept. 10, 1917 |